(12) United States Patent
Kakumanu

(10) Patent No.: US 12,143,900 B2
(45) Date of Patent: Nov. 12, 2024

(54) SENDING OR RECEIVING SMS BY INTERNET MESSAGING APPLICATION WITHOUT USING INTERNET

(71) Applicant: Sarath Kakumanu, Chennai (IN)

(72) Inventor: Sarath Kakumanu, Chennai (IN)

( * ) Notice: Subject to any disclaimer, the term of this patent is extended or adjusted under 35 U.S.C. 154(b) by 305 days.

(21) Appl. No.: 17/769,777

(22) PCT Filed: Oct. 19, 2020

(86) PCT No.: PCT/IN2020/050893
§ 371 (c)(1),
(2) Date: Apr. 18, 2022

(87) PCT Pub. No.: WO2021/074933
PCT Pub. Date: Apr. 22, 2021

(65) Prior Publication Data
US 2022/0386082 A1    Dec. 1, 2022

(30) Foreign Application Priority Data

Oct. 19, 2019    (IN) .............................. 201941042510

(51) Int. Cl.
*H04W 4/14*    (2009.01)
*H04L 51/234*    (2022.01)

(52) U.S. Cl.
CPC ............. *H04W 4/14* (2013.01); *H04L 51/234* (2022.05)

(58) Field of Classification Search
CPC ................................ H04W 4/14; H04L 51/234

USPC ........................................................ 455/466
See application file for complete search history.

(56) References Cited

U.S. PATENT DOCUMENTS

| | | | | |
|---|---|---|---|---|
| 2010/0191602 A1* | 7/2010 | Mikkelsen | ............. | G06Q 40/00 715/810 |
| 2014/0194151 A1* | 7/2014 | Bengtsson | ............. | H04L 51/04 455/466 |
| 2016/0183068 A1* | 6/2016 | Shen | ...................... | G06Q 10/04 455/466 |
| 2019/0116140 A1* | 4/2019 | Bailly | .................. | H04L 51/043 |

* cited by examiner

*Primary Examiner* — Qutbuddin Ghulamali
(74) *Attorney, Agent, or Firm* — Jose Cherson Weissbrot

(57) ABSTRACT

The present disclosure provides a system and method of sending and receiving messages from a first device or sender to a second device or receiver through the internet messaging application in the absence of internet connectivity is the first-of-its-kind feature that ensures 'delivery of messages' at all times. When the user is temporarily disconnected from the internet, still they can send the message by selecting the 'SMS' option and the message will be delivered instantly to the recipient's message folder. Once the internet is resumed, the same message will he automatically sent also to the recipient's Internet message folder. This device independent application allows the users to access this feature from a smart mobile phone, a tablet computer, a laptop computer and a desktop computer etc. Incorporating the feature of sending internet messages without the net connectivity by using the internet messaging application in the absence of internet connectivity ensures a smooth flow of communication.

9 Claims, 11 Drawing Sheets

SENDING OR RECEIVING SMS BY INTERNET MESSAGING APPLICATION WITHOUT USING INTERNET

TECHNICAL FIELD

The present invention relates to information technology and computer applications. More specifically, the present invention relates to messaging applications for mobile communication devices.

BACKGROUND OF THE INVENTION

Mobile communication devices, such as mobile phones, ios devices, android devices along with digital tablets, desktop computers are increasingly powerful and the sources of potential incoming and outgoing messages are increasingly more varied. As a result, such mobile communication devices are being designed and built to permit users to accept various different heterogeneous messages and that can handle such messages in a user friendly and convenient manner by sending and receiving the messages without internet within an internet messaging platform. The present invention brings in a new paradigm in the messaging applications industry where the invention proposed herein is going to create a lasting impression in the messaging application altogether by addressing certain key challenges in the existing messaging application tools, such as, WhatsApp, Facebook Messenger, Google Hangout, WeChat, Telegram, Signal, IMO, Hike and so on.

Over-the-top (OTT) mobile messaging services and messaging apps, such as WhatsApp and Telegram enable mobile messaging via an internet connection. Usage of OTT mobile messaging has already surpassed usage of SMS texting, largely due to the increasing use of mobile phones that have uninterrupted internet access. Other examples of OTT mobile messaging include WeChat®, Facebook®, Messenger, Skype®, Kik™, GroupMe®, MessageMe™, and Snapchat®. The desktop and laptop computers, computer notebooks, and tablet computers having a touch display can also run desktop versions of these smart-phone-based mobile messaging apps.

With the advent of modern mobile communication networks, internet messaging services have gained a lot of popularity and hence reached wide adoption across the world. So, the users need a variety of features to use the messaging application conveniently. One such feature is sending and receiving of messages without the internet. 'SMS' (short message service) is a text messaging service component of most mobile telephone devices, It uses standardized communication protocols to enable mobile devices to exchange short text messages.

Conventional internet mobile messaging services do not have the feature of sending messages without the internet which in other words means, to send the messages when the mobile is offline. In such instances, the existing messaging application users can send the messages as SMS through their mobile messaging system separately instead of using the internet based messaging application, because none of the popular messaging applications provide this feature. Thus, there exists a need for a solution to this, thereby enabling users to send messages without going out of their message folder of the internet based messaging application.

Based on the foregoing, it is believed that a need exists for an improved structured messaging application for sending messages without interne from an individual's message folder within an internet messaging application in a simple manner wherein the internet messaging application is installed in communication devices like digital tablets and mobile phones.

SUMMARY OF THE INVENTION

The following summary is provided to facilitate an understanding of some of the innovative features unique to the disclosed embodiment and is not intended to be a full description.

An object of the present invention is to overcome the drawbacks of the existing prior art techniques by providing a user-friendly mechanism of addressing the challenges faced by the users in sending messages via an internet based messaging application without having internet connectivity.

Another object of the present invention is to allow users to select options of sending the messages via SMS service without leaving the internet based messaging application.

It is, therefore, one aspect of the present invention to provide an improved structured messaging application for sending messages as SMS through the internet messaging application without Internet in an effortless way. The sent SMS can be viewed on the sender's mobile message folder as SMS and also within the internet messaging folder with the tag 'SMS' and the delivery status of the message is in 'Not Sent' state while the internet connectivity is not available.

It is another aspect of the disclosed embodiment to provide an improved structured messaging application for receiving messages as SMS through the internet messaging application without internet connection within the individual message folder of an internet based messaging application. It is a new and user-friendly way of receiving SMS without Internet on communication devices (SIM enabled Digital Tablets and Mobile Phones) sent from the internet messaging applications.

It is a further aspect of the present invention to provide a choice in the internet based messaging application for sending a message through offline mode instead of SMS service such that the message sent through offline mode will be delivered automatically once the sender is connected to the internet. The present invention therefore is a new and effortless way of sending messages through SMS or offline triode using an internet based messaging application.

Even if the sender does not have the internet connectivity, the sender gets the option of sending their messages immediately through SMS mode or offline mode. If the sender chooses the offline mode, the message will be sent once he/she is reconnected to internet. If the sender chooses SMS option then the message will be sent immediately via the SMS service provided by communication network. The present invention has adopted a novel and user-friendly mechanism for addressing the above discussed challenges and provides the useful feature of sending SMS message without internet using a very convenient graphical user interface, as described in greater detail herein. The internet messaging applications referred here can be accessed on all types of communication devices like smart mobile phones, desktop computers, laptop computers and digital tablets.

The aforementioned aspects and other objectives and advantages can now be achieved as described herein. A system and method for sending message as SMS through an internet messaging application without using internet from an individual folder in the structured messaging application.

The sent SMS message will be delivered to the message inbox of the receiver immediately. The messages sent through SMS option will be available in the sender and receiver mobile message folders (SMS folder) as well as the internet messaging application of the sender. The recipient will receive the same message in the internet message application after the sender has the internet connection. All devices where the sender and receiver has logged in the internet messaging application such as but not limited to laptop and desktop computers, digital tablets and mobile phones can view the message with a tag "SMS" (in text format).

Sending messages without internet feature of the present invention provides an effortless way of sending the important/required information as a SMS when internet connectivity is not available. The message is viewed in the sender's mobile message outbox and in receiver's mobile message inbox. The messages in the internet messaging application carries the tag 'SMS' for the purpose of easy identification and filtration within the internet messaging application folder.

The internet messaging application permits the users to send messages as SMS or in offline mode which is delivered only when the internet connectivity is available, For example, if a member in the group would need to send a message to another person while internet is not available, the user can choose the option of sending the message through SMS instantly. This way, communication between individuals is assured in the same message folder of the internet messaging application, instead of clicking or viewing different messaging applications.

The other aspects of the invention will be apparent from the detailed description that follows.

BRIEF DESCRIPTION OF THE DRAWINGS

The above and other aspects, features, and advantages of certain exemplary embodiments of the present invention will be more apparent from the following description taken in conjunction with the accompanying drawings.

Figure 1:
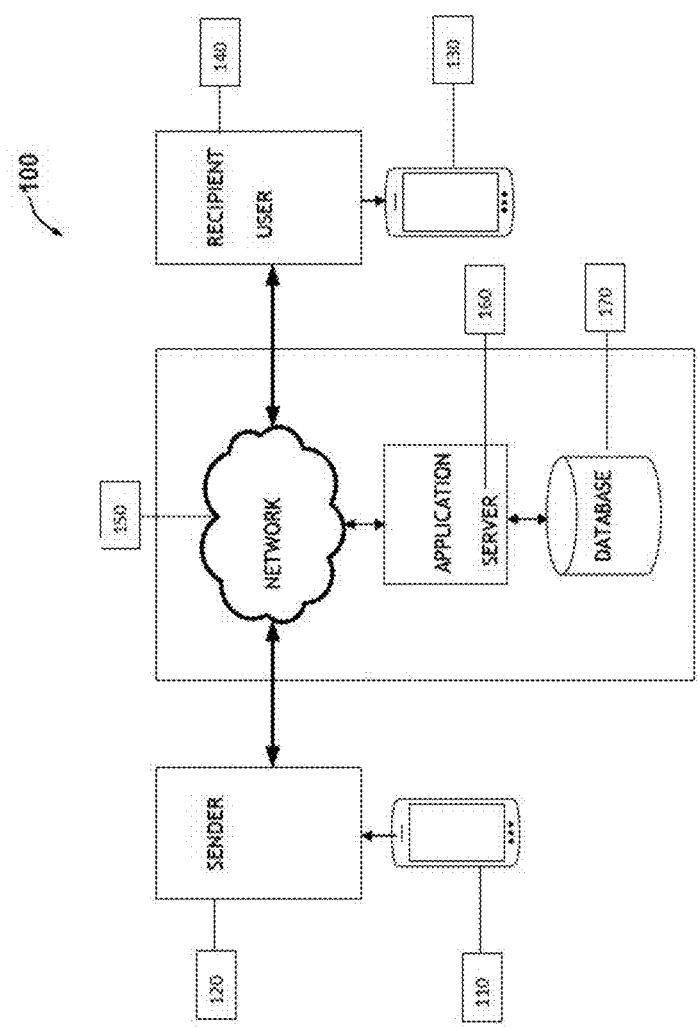
FIG. 1 shows a schematic diagram of how the message travels from sender to recipient in accordance with state of art.

Persons skilled in the art will appreciate that elements in the figures are illustrated for simplicity and clarity and may have not been drawn to scale. For example, the dimensions of some of the elements in the figure may be exaggerated relative to other elements to help to improve understanding of various exemplary embodiments of the present disclosure. Throughout the drawings, it should be noted that like reference numbers are used to depict the same or similar elements, features, and structures.

DETAILED DESCRIPTION OF THE DRAWINGS

The embodiments now will be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the invention to those skilled in the art.

The embodiments now will be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and it will completely convey the scope of the invention to those skilled in the art. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated. features, integers, steps, operations, elements, and/or components, but do not preclude the presence or addition of different features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention relates to a user-friendly mechanism to send or receive text messages as SMS from an internet messaging platform without using internet and also without changing the application. Further, the present invention specifically relates to an improved system and method for sending or receiving messages while being in offline mode thereby achieving sending and receiving of text messages such as SMS in a simple way from the internet messaging platform itself without having to move to the SMS message platform from the internet messaging platform.

FIG. 1 shows a general overview of the system for sending message e.g. text, image and/or video messaging. As shown, the system (100) includes a first terminal device (110) or a first mobile device at a sender's network (120), a second terminal device (130) or a second mobile device at a recipient's network (140), and a network (150) including an application server (160) having a database (170). Both the mobile devices (120, 140) are capable of communicating with each other via a mobile switching service centre and also with the internet network. In addition, the mobile devices are also installed with the messaging platform application capable of sending SMS using SMS service provided by the communication network.

In one embodiment of the present invention, disclosed is a system for sending or receiving SMS by an internet based messaging application without interact which is first-of-its-kind digital communication system. The system comprises of an electronic mailing server unit (Exclusive High-end Server located on the cloud or on premise) for receiving, processing and sending messages within the network. It further comprises of a plurality of terminal devices of different kind like a smart mobile phone/SIM enabled digital tablet computer to send and receive and display the SMS on a mobile messaging application. The message sent as SMS from the smart mobile phone can be viewed on a desktop computer/laptop computer, digital tablet and smart mobile phone of the receiver internet messaging application once the internet is connected to the sender's smart phone or digital tablet with a SIM card.

Figure 2:
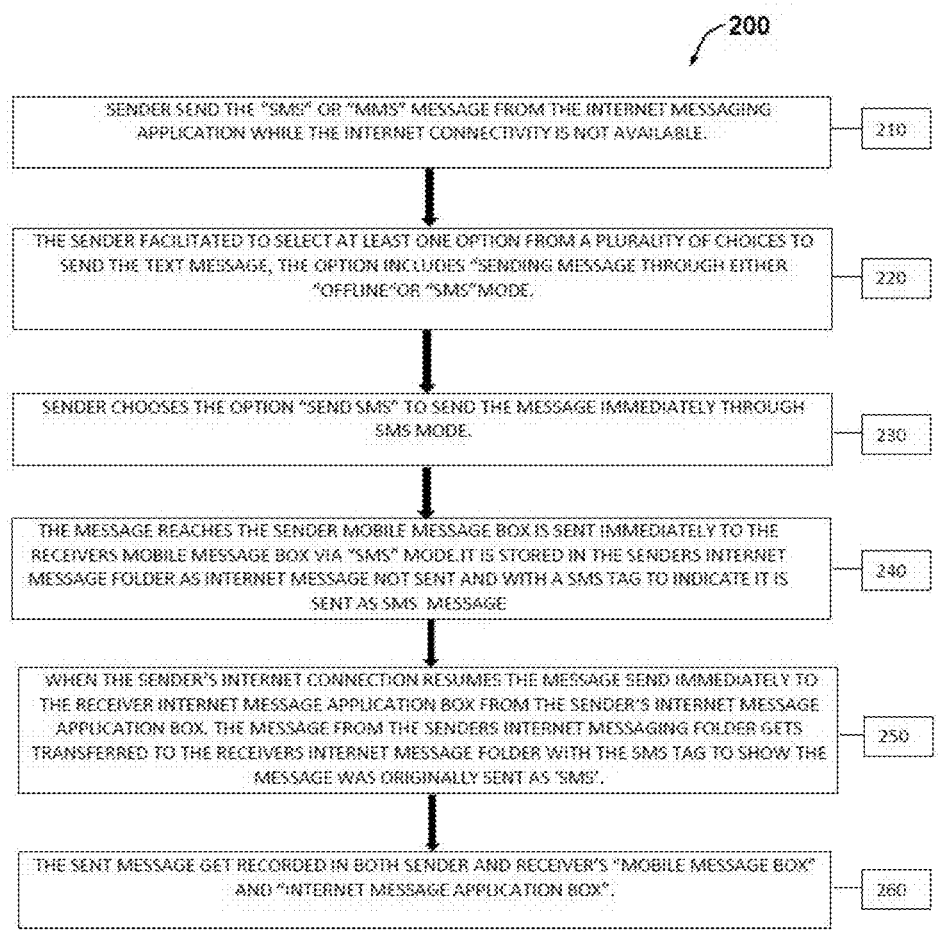
FIG. 2 shows a method of facilitating to send a message as a short message service (SMS) message from a sender to a recipient (receiver's device) using an internet application platform, according to the embodiments of the present invention.

FIG. 2 shows a method of facilitating to send a message as a short message service (SMS) message or a multimedia message service (MMS) message from a sender to at least one recipient using an internet messaging application platform.

At step (210), a sender composes a message on an internet messaging. application with an intention to send the message as SMS or MMS via the same application without changing the application platform for communication when the internet connectivity is not available.

At step (220), the method disclosed by the present invention facilitates the sender to choose an option for sending the message. The user selects at least one option from a plurality of choices to send or transmit the text message, the option includes but not limited to sending message through offline mode or SMS. The method permits the users to send messages as SMS or in offline mode in which said message is delivered only when the internet connectivity is available. The user can choose the option of sending the message through SMS instantly or can simply keep it in offline mode to send the same message later, thereby facilitating seamless connectivity between individuals in the same message folder, thereby eliminating the need of clicking or viewing. different messaging. platforms.

At step (230), the method facilitates the sender to send the message through SMS service.

At step (240), the method allows the user (sender) to transmit the message as SMS via mobile network to the second device (receiver). This SMS message is viewed in sender's message outbox and in receiver message inbox/folder as a separate message, wherein the messages cardes the tag 'SMS' for the purpose of easy identification and filtration within the folder. If the user opts for sending message through offline mode instead of a SMS. the message will be sent through offline mode which will be delivered automatically once the sender is connected to the internet.

At step (250), when the internet connectivity of the sender resumes, the same message which was earlier received as SMS gets delivered in the receiver's internet messaging application inbox with "SMS" tag.

At step (260), the message gets recorded in both sender's and receiver's mobile messaging box and internet message application box with the tag SMS for easy search and filtration.

In an alternative embodiment, the present invention facilitates sending messages without internet from individual folders to all the members or selected members of the group folder in the internet messaging application.

Further, if the message is sent through SMS, the message will be sent through normal mobile SMS message protocol and viewed as a normal mobile SMS message. In the SMS mode, the message will he sent from mobile SMS and it records the sent message in the messaging application with a tag 'SMS' for easy search or filtration of data in future. If the user, opts to send message in offline mode, then the message is stored in the user's (sender) device. Once the internet service is resumed, the message stored for offline mode is then sent to the recipient automatically.

In addition, in this method another copy of the message is sent through the internet messaging application and the same can be viewed in the internet messaging folder of the recipient. The method of the present invention thus provides an effortless way of sending the important/required information as a 'SMS' while internet connectivity is not available for the sender from his internet messaging application.

The features disclosed by the present invention provide a lot of technical advantages over the methods of conventional mobile messaging services which do not allow users to send messages via the same internet application when the internet connectivity is not available. The present invention provides an internet based platform which enables the users to send messages as SMS without going out of their message folder on the same platform. Even if the users don't have internet connectivity, the users get the option of sending their messages immediately through SMS, MMS or offline mode. If the users choose the offline mode, the message will be sent once they reconnect with internet. If they choose SMS, then the message will be sent immediately.

Figure 3:
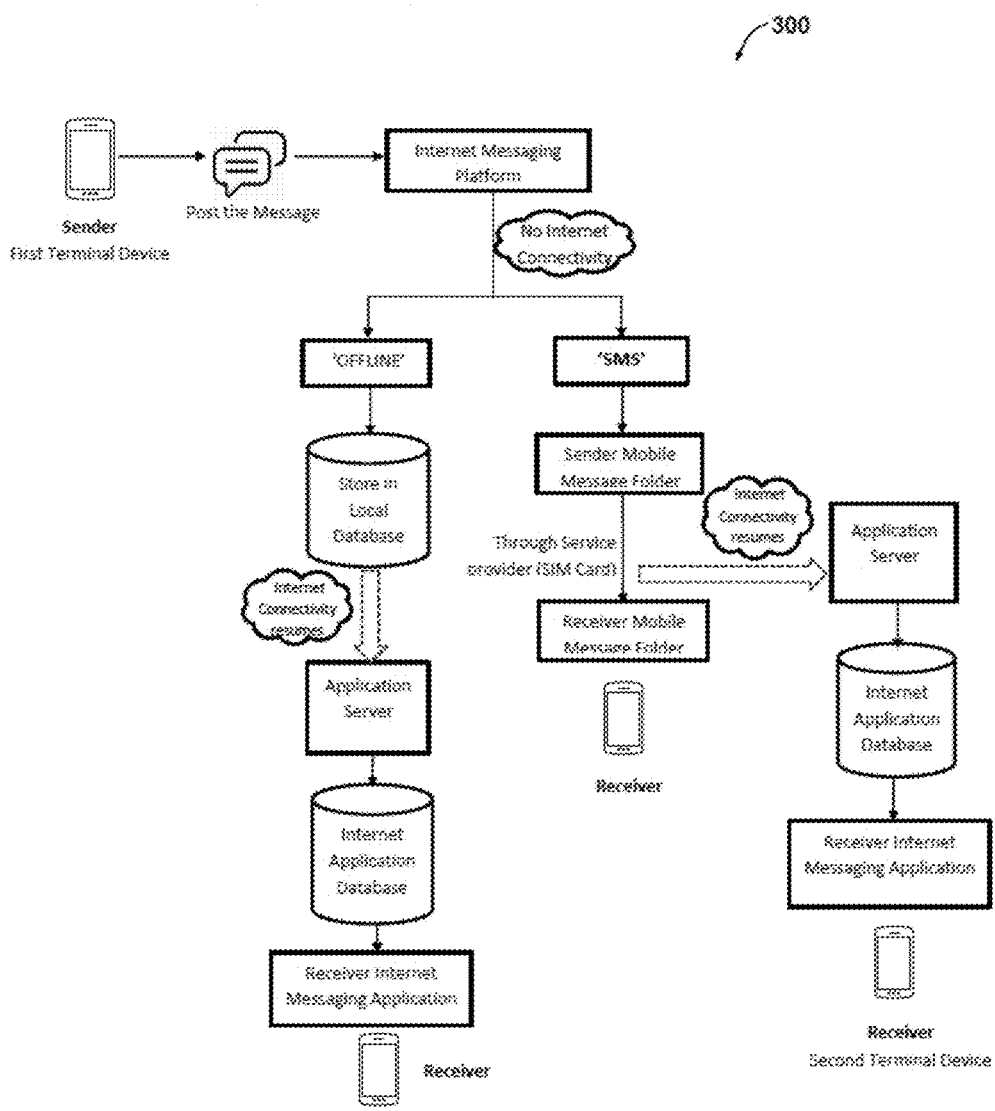
FIG. 3 illustrates a graphical representation of the flow diagram for sending the SMS from the sender (First terminal device) to Receiver (Second Terminal Device) through the Internet Messaging Application via "Offline" mode or "SMS".

FIG. 3 illustrates a graphical representation of the flow diagram for sending the SMS from the sender (First terminal device) to Receiver (Second Terminal Device) through the Internet Messaging Application via "Offline" mode or "SMS".

In an exemplary embodiment, sender creates or composes a text message, or an image, or a video on their mobile device. Once composing of message is done, the sender sends the message, image, or video to a recipient i.e. a second user over a network. The communication between the two devices via network may be through a mobile network or the internet network. In the disclosure, the first terminal device is referred to as the sender and the second terminal device is referred to as the receiver. This is solely to facilitate the understanding of a person having ordinary skill in the art and not by way of imposing any limitation in the scope of the invention.

In the absence of interact connectivity, the option is given for the sender to select either "Offline" or "SMS" mode to send the message via internet messaging platform.

If the sender selects the 'Offline' mode, the sent message gets updated and stored in a local database. Once the Internet connectivity resumes the message from the local database moves to the application server and then to the Internet Application database and finally reaches the receiver (Second Terminal Device) Internet Messaging Application.

If the sender selects the 'SMS' mode the message reaches the Sender Mobile Message Folder. By the respective Service Provider in the sender mobile (SIM card-Subscriber Identity Module) the message from the sender mobile message folder reaches the receiver mobile message folder (of registered mobile number) via respective Service Provider of the receiver.

Meanwhile, the message sent can be seen in the internet messaging application of the Sender with the tag showing the word 'SMS' in text format. Once the sending option is chosen as 'SMS' the message get tagged with the text 'SMS' from the backend. Once the internet connectivity of the sender resumes, it trigger the message automatically from the first terminal device (sender) internet messaging application to the second terminal device (receiver) internet messaging application. The sent message reaches the high end application server of the receiver. And then it get stored in the Internet application database and viewed in the Internet messaging folder of the receiver with the tag 'SMS'.

Figure 4:
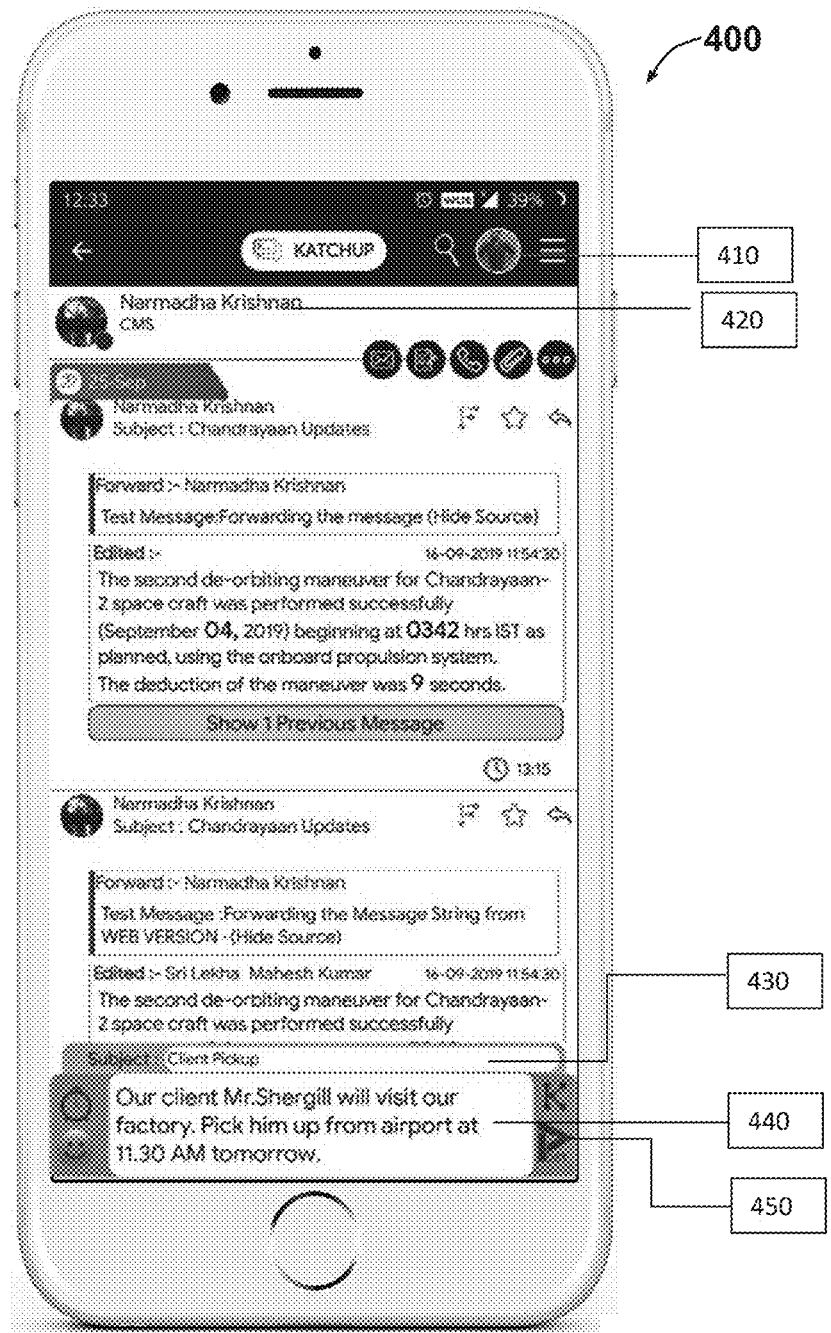
FIG. 4 illustrates a graphical representation of the message folder of the user (sender) who has started writing a message to send to one of his/her contacts, in accordance with the embodiments of the present invention.

FIG. 4 illustrates a graphical representation of the message folder (400) of the sender. In that, (410) is the sender's profile picture, (420) represents the receiver's name. (430) shows the subject of the message. (440) shows the message content and (450) represents the icon to send a message.

Figure 5:
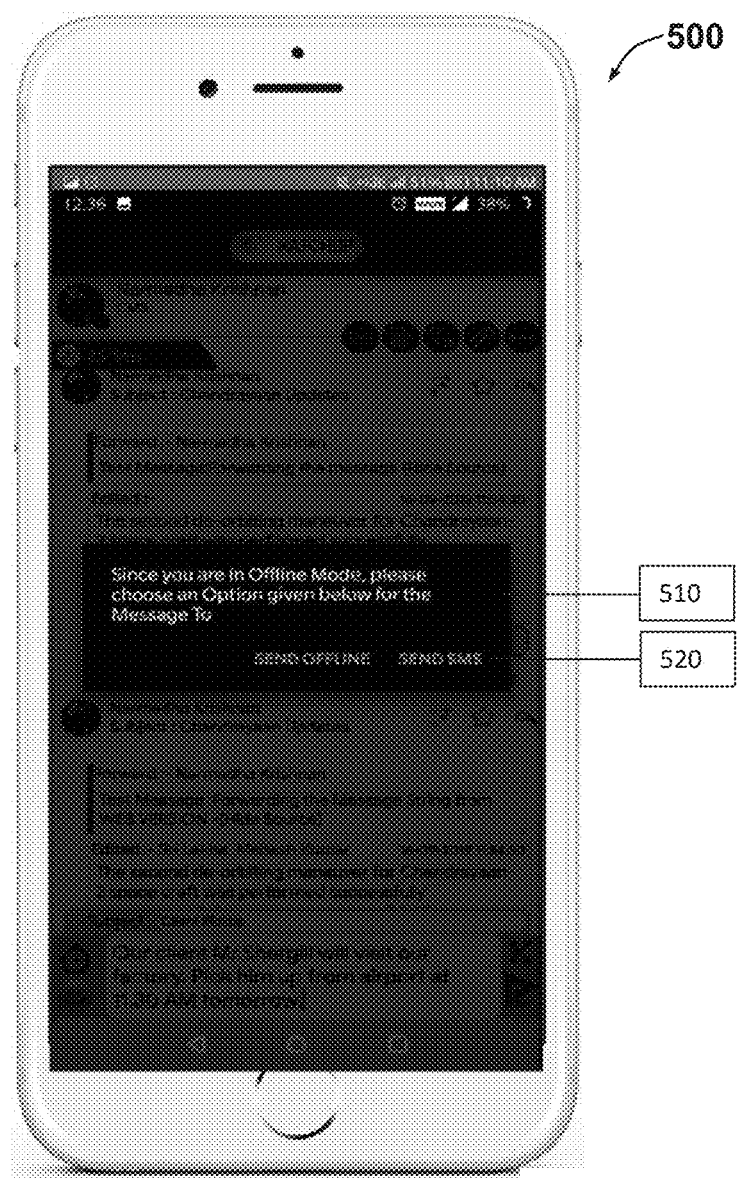
FIG. 5 illustrates a graphical representation of the user's message folder where the user (sender) gets an option of sending the message through Offline mode or SMS when the internet connectivity is not available to the sender, in accordance with the embodiments of the present invention.

FIG. 5 illustrates a graphical representation of the user's internet message folder (500) that shows (510) sending the message through offline mode or via SMS while internet is not available (520) shows sending message by choosing option send 'SMS'.

Figure 6:
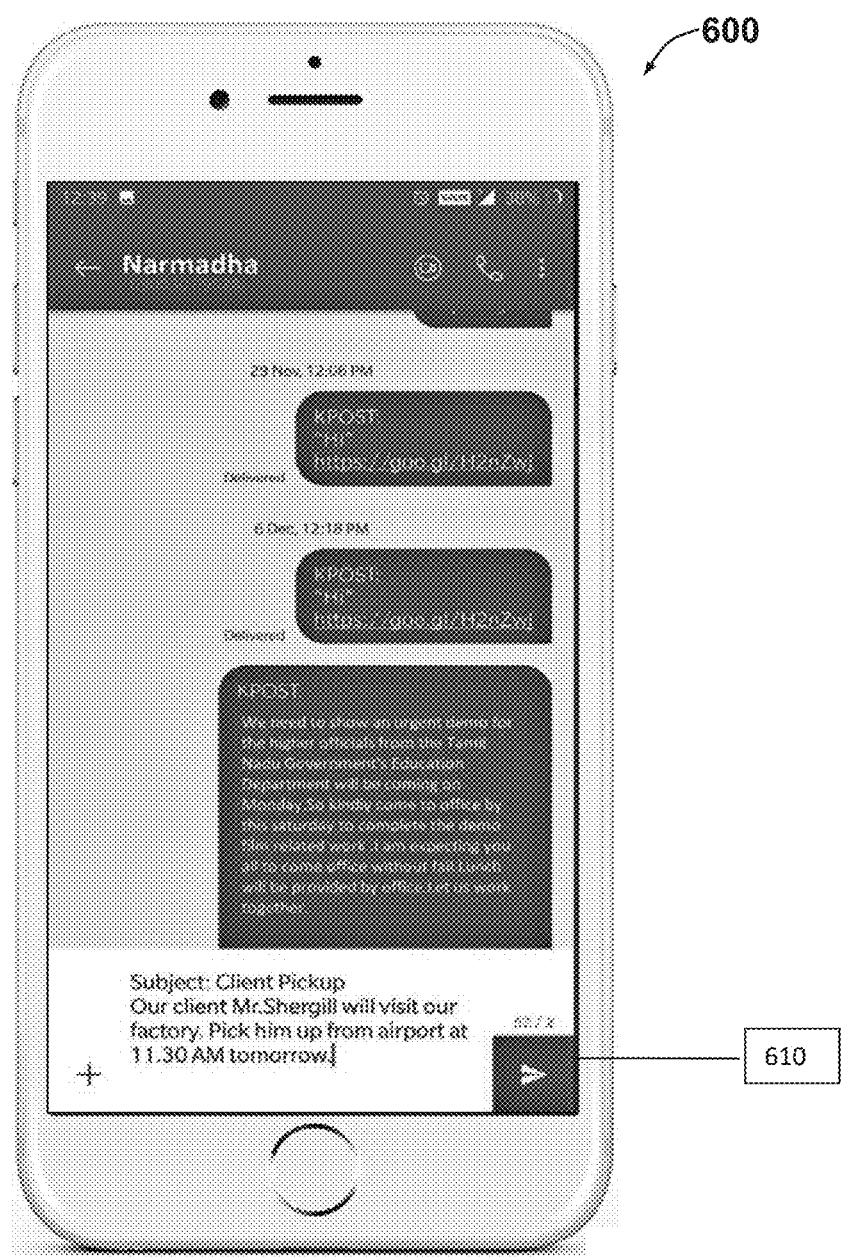
FIG. 6 illustrates a graphical representation of the screen image that shows the sender's mobile messaging system's folder that shows that the SMS is ready to be sent from the messaging application, in accordance with the embodiments of the present invention.

FIG. 6 illustrates a graphical representation of the user's (sender) mobile messaging folder (600) that shows the message (610) which is ready to be sent.

Figure 7:
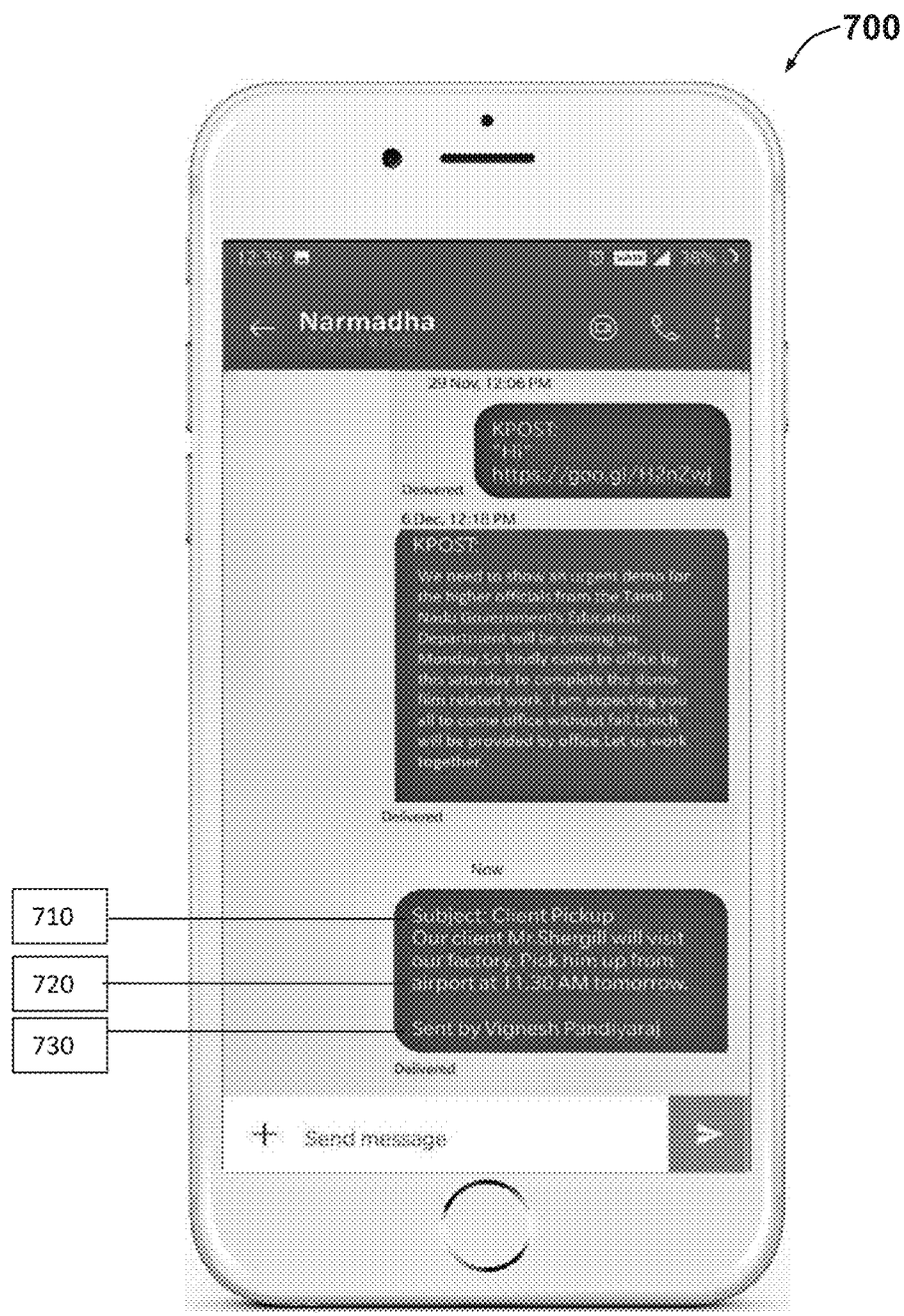
FIG. 7 illustrates a graphical representation of the screen image that shows the sender's mobile messaging system's folder showing the SMS sent from the messaging application, in accordance with the embodiments of the present invention.

FIG. 7 illustrates a graphical representation of the user's (sender) mobile messaging folder (700) that shows (710) subject of the message. (720) sender's view of the message copy that was sent by the sender. (730) shows the sender name (Name of the Sender logged in the Internet Messaging Application to send the SMS).

Figure 8:
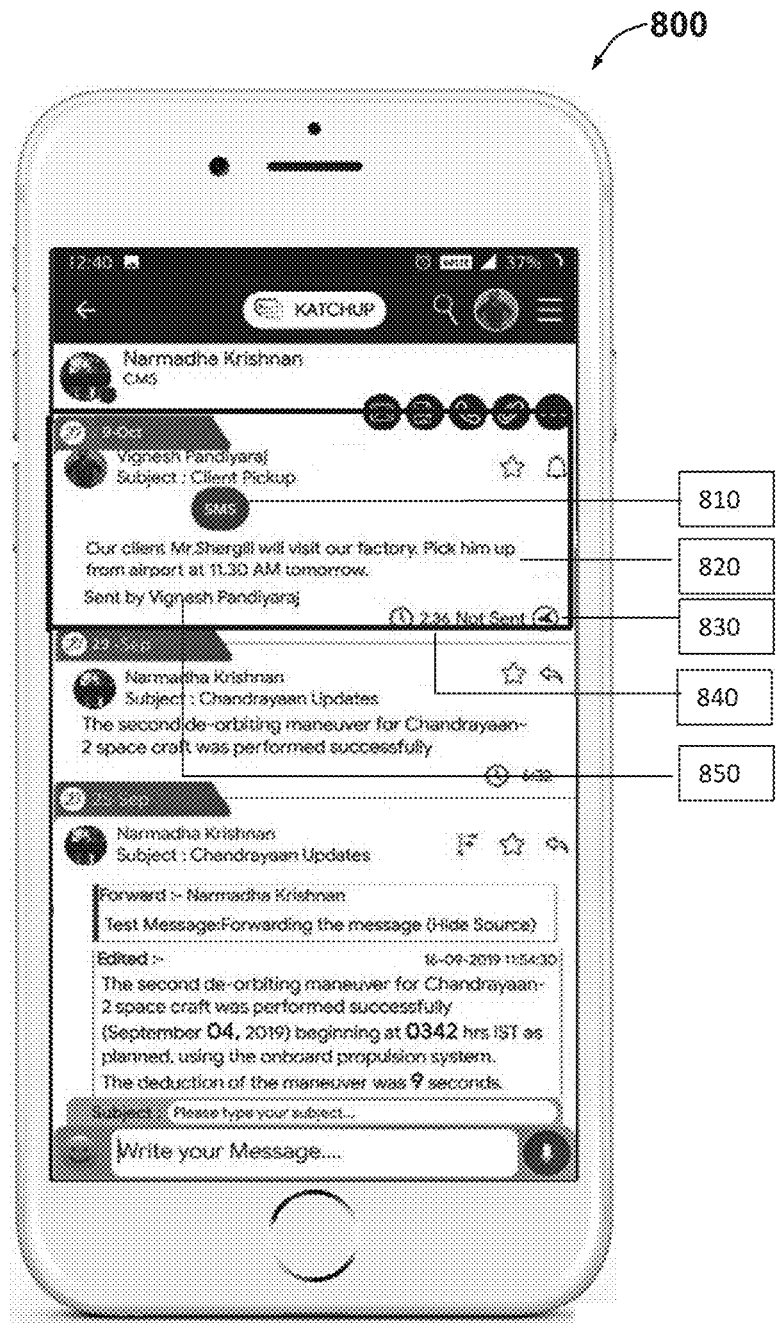
FIG. 8 illustrates a graphical representation of the internet messaging application that shows the internet message folder of the user (sender) and which shows the recently sent message through SMS, in accordance with the embodiments of the present invention, in the user's internet messaging platform.

FIG. 8 illustrates a graphical representation of the user's (sender) internet message folder (800) after sending a message through SMS. In that, (810) shows the tag 'SMS', (820) represents the message sent as SMS, (830) shows the status of the 'SMS'-Not Sent, (840) shows the timestamp of message sent, (850) shows the sender name (Name of the Sender logged in the Internet Messaging Application to send the SMS).

Figure 9:
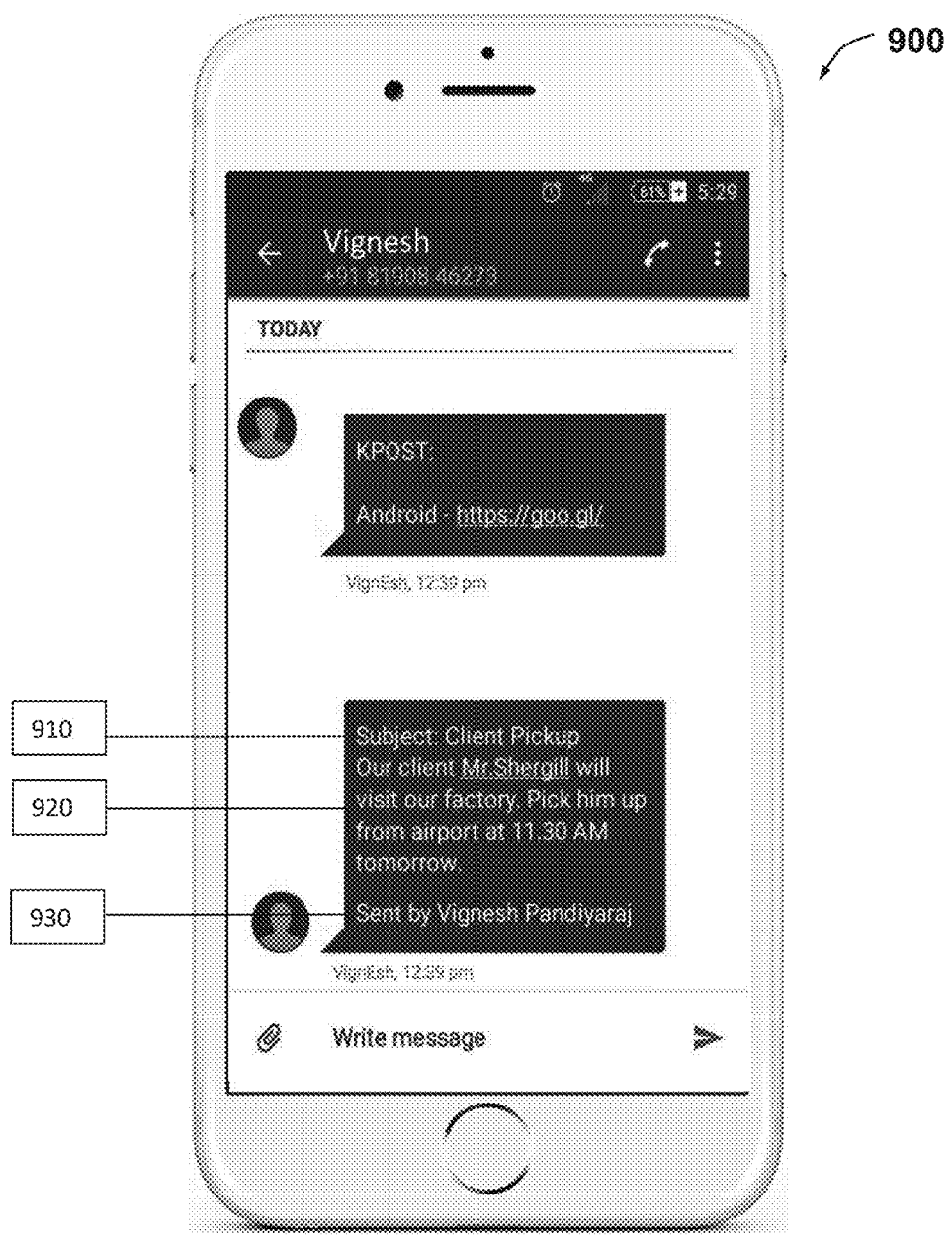
FIG. 9 illustrates a graphical representation of the receiver's message folder of the mobile device showing the received SMS, in accordance with the embodiments of the present invention.

FIG. 9 illustrates a graphical representation of the receiver's mobile message folder (900). In that shows (910) subject of the message. (920) receiver's view of the message copy that was sent by the sender in the absence of Internet connectivity which gets stored in the receivers mobile messaging system, (930) shows the sender name (Name of the Sender logged in the Internet Messaging Application to send the SMS).

Figure 10:
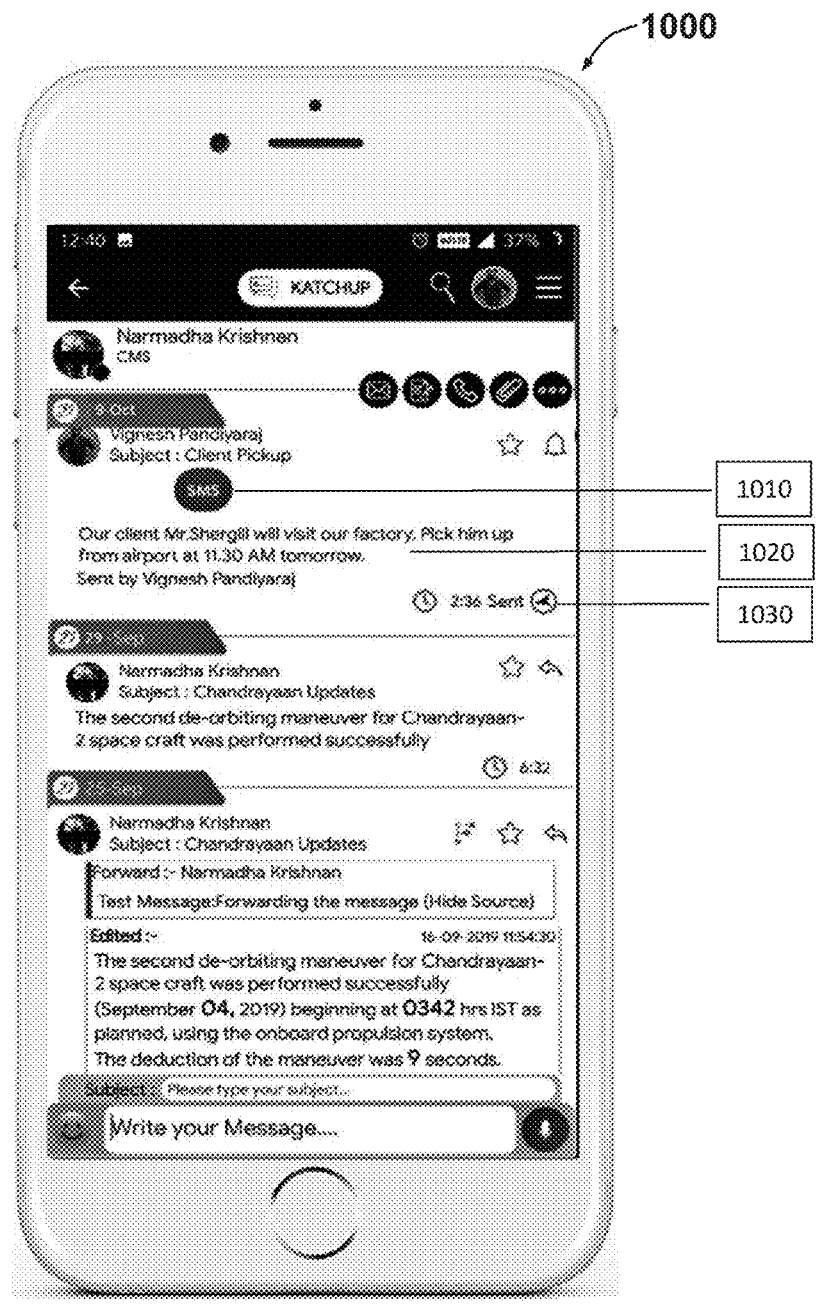
FIG. 10 illustrates a graphical representation of the sender's message folder of the internet messaging application showing the message with a tag 'SMS' and status 'Sent' which denotes the message is sent from the internet messaging application once the sender's internet connectivity resumes, in accordance with the embodiments of the present invention.

FIG. 10 illustrates a graphical representation of the sender's internet messaging application's message folder (1000). In that. (1010) shows the tag 'SMS', (1020) represents the SMS message sent from the internet message folder with the tag 'SMS' once the internet connectivity resumes. (1030) shows the message status as 'Sent' in sender side.

Figure 11:
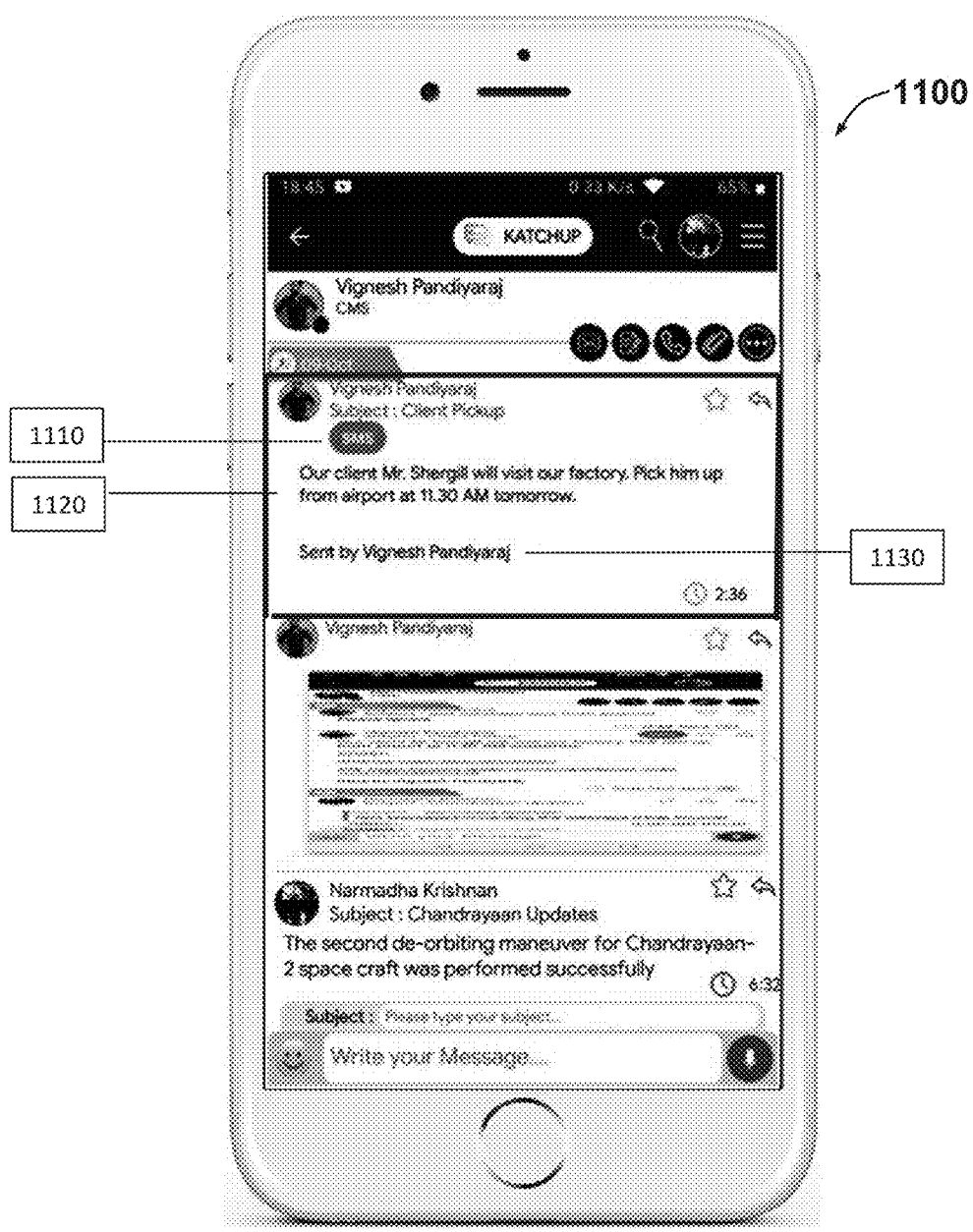
FIG. 11 illustrates a graphical representation of the receiver's message folder of the internet messaging application showing the message with a tag 'SMS' which denotes the message received has also been sent as a mobile SMS message from the internet messaging application, in accordance with the embodiments of the present invention.

FIG. 11 illustrates a graphical representation of the receiver's internet messaging application's message folder (1100). In that, (1110) represents the tag 'SMS', (1120) the received SMS message in the internet message folder of the recipient with the tag 'SMS'. (1 130) shows the sender name.

In an implementation of the present invention, disclosed is a hand-held electronic device (such as tablet computers and mobile phones) capable of sending and. receiving and further displaying the messages on an internet messaging application and the mobile internet messaging application is configured to perform the method disclosed in the present invention.

While the present invention has been described in connection with a series of embodiments, these descriptions are not intended to limit the scope of the invention to the particular forms set forth herein. The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents. The present descriptions are intended to cover such alternatives, modifications, and equivalents as may be included within the spirit and scope of the invention as defined by the appended claims and otherwise appreciated by one of ordinary skill in the art. in several respects, embodiments of the present invention may act to close the loopholes in the current industry practices in which good business practices and logic are lacking because it is not feasible to implement with current resources and tools.

It will be appreciated that variations of the above-disclosed and other features and functions, or alternatives thereof, may be desirably combined into many other different systems or applications. Also, unforeseen or unanticipated alternatives, modifications, variations or improvements therein may be subsequently made by those skilled in the art which are also intended to be encompassed by the following claims.

I claim:

1. A method for sending messages by a sender from an internet messaging application and/or mobile messaging application and receiving the messages by a receiver in mobile messaging application and/or internet messaging application, the method comprises the steps of:

creating a message by the sender, using an interface of Internet Messaging Application installed in subscriber identity module (SIM) enabled communication device;

providing a plurality of options on the interface of the internet messaging application for sending the message, wherein the plurality of options for sending the message includes sending message through offline mode or sending the message as short message service (SMS) from the internet messaging application and/or the mobile messaging application;

selecting an option by the sender, from the plurality of options for sending the message to a receiver's SIM enabled communication device;

transmitting the message from the internet messaging application and/or a mobile messaging application installed on the sender's SIM enabled communication device to the internet messaging application or mobile messaging application installed on the receiver's terminal device, wherein the message is transmitted based on the option selected by the sender and/or connectivity of the sender's terminal device to internet, wherein the option of sending the message as SMS service while the internet connectivity of the sender is not available includes, sending the message through SMS from the sender's internet messaging application that automatically redirects to the mobile messaging application of the sender:

message in the sender's internet messaging application shows the tag SMS with a status such as but not limited to "Not Sent":

receiving the message, by a receiver, in the mobile messaging application instantaneously from the sender, wherein the receiver receives the SMS message on his/her registered mobile number:

once the internet connectivity of the sender resumes, the message sent as SMS is pushed automatically from the sender's internet messaging application to the receiver's internet messaging application with the 'SMS' tag; and after successful transmission, the message is stored and displayed in message folders of the internet messaging application and the mobile messaging application installed on the sender and receiver terminal device.

2. The method as claimed in claim 1, wherein the internet messaging application is configured to send and receive messages using internet.

3. The method as claimed in claim 1, wherein the mobile messaging application is configured to send and receive messages using cellular communication network.

4. The method as claimed in claim 1, wherein the message is transmitted with a tag that identifies how the message is transmitted.

5. The method as claimed in claim 1, wherein after successful transmission, the message in the sender's internet messaging application shows a status "Sent" along with a tag "SMS".

6. A system for sending and receiving messages, wherein the system comprises:
   a first device configured to send and receive messages using internet messaging application and mobile messaging application;
   a second terminal device configured to send and receive messages using internet messaging application and mobile messaging application; and
   a server unit configured to receive, process and send messages to and from the first and the second terminal devices, wherein the first and the second terminal devices are communicably coupled to the server unit; and
   wherein the first and the second terminal devices are configured to send and receive messages in accordance with the method as claimed in claim 1.

7. The system as claimed in claim 6, wherein the server unit is located on a cloud platform or on premise for receiving, processing and sending messages to and from the first and the second terminal devices.

8. The system as claimed in claim 6, wherein the server unit is an Executive High End Server.

9. A non-transitory computer readable storage medium, containing program instructions for execution on a computer system, which when executed by a computer, cause the computer to perform method steps of a method for prioritizing a plurality of secondary target protein, the method comprising the step as claimed in claim 1.

* * * * *